US006781712B1

(12) United States Patent
Komiyama et al.

(10) Patent No.: US 6,781,712 B1
(45) Date of Patent: Aug. 24, 2004

(54) APPARATUS FOR CONTROLLING THE ROTATIONAL SPEED OF THE INK FOUNTAIN ROLLER ON THE BASIS OF THE RATE OF AREA OF THE PICTURE

(75) Inventors: Akira Komiyama, Ueda (JP); Hiroyuki Fujii, Ueda (JP)

(73) Assignee: Shinano Kenshi Kabushiki Kaisha, Nagano (JP)

(*) Notice: Subject to any disclaimer, the term of this patent is extended or adjusted under 35 U.S.C. 154(b) by 856 days.

(21) Appl. No.: 09/688,240

(22) Filed: Oct. 16, 2000

(30) Foreign Application Priority Data

May 17, 2000 (JP) ...................................... 2000-145429

(51) Int. Cl.[7] ........................... G06F 3/12; G06F 13/00

(52) U.S. Cl. .......................... 358/1.5; 358/1.6; 358/1.2

(58) Field of Search ......................... 358/1.5, 1.1, 1.14, 358/1.6; 399/50, 51, 59, 60, 61, 58; 355/13, 76, 91; 101/103, 466, 295, 300, 309; 271/119, 298; 347/129, 175

(56) References Cited

U.S. PATENT DOCUMENTS 5,512,927 A * 4/1996 Okamoto .................... 347/129
5,630,583 A * 5/1997 Yergenson .................. 271/119
5,740,494 A * 4/1998 Shoji et al. .................. 399/71

FOREIGN PATENT DOCUMENTS

| | | | |
|---|---|---|---|
| JP | A811292 | 1/1996 | B41F/31/02 |
| JP | A11115159 | 4/1999 | B41F/31/04 |

* cited by examiner

*Primary Examiner*—Gabriel Garcia
*Assistant Examiner*—Douglas Tran
(74) *Attorney, Agent, or Firm*—Birch, Stewart, Kolasch & Birch, LLP

(57) ABSTRACT

The image printing system is capable of properly defining amount of ink without adjusting ink clearance. The image printing system includes an offset printing machine, in which proper amount of ink is supplied to a plate drum via an ink fountain roller on the basis of image data. A memory stores the image data of an original image and an ink amount table, in which rotational speed data of the ink fountain roller correspond to rate of area of picture in the original image. A control unit calculates the rate of area of picture on the basis of the image data, reads the rotational speed of the ink fountain roller from the ink amount table on the basis of the rate of area of the picture, corrects the rotational speed so as to define proper control data for rotating the ink fountain roller, and sends the proper control data to the offset printing machine so as to control the amount of ink to be supplied to the plate drum.

4 Claims, 7 Drawing Sheets

APPARATUS FOR CONTROLLING THE ROTATIONAL SPEED OF THE INK FOUNTAIN ROLLER ON THE BASIS OF THE RATE OF AREA OF THE PICTURE

BACKGROUND OF THE INVENTION

The present invention relates to an image printing system, more precisely relates to an image printing system, in which image data of an original image on a printing plate are inputted and amount of ink of an offset printing machine is properly controlled to print the image on a sheet-shaped medium.

Conventional methods and devices for setting amount of ink of offset printing machines have been disclosed in some documents, e.g., Japanese Patent Gazettes No. 8-11292, No. 11-115159. For example, in the Japanese Patent Gazettes No.8-11292, an ink preset device, which is capable of presetting amount of ink to be supplied, is disclosed. In the ink preset device, an image on a printing plate is read by an image scanner, and the scanned image data are stored in a server. The server has: an ink clearance correcting value table, which includes values for correcting ink clearance, which defines amount of ink, on the basis of kinds of ink; and a mechanical correcting value table, which includes values for correcting mechanical conditions on the basis of types of printing machines, etc. The server calculates rate of area of picture in each segment on the basis of the scanned image data. Then, the server selects proper correcting values, from the ink clearance correcting value table and the mechanical correcting value table, on the basis of the rate of area of picture. To properly adjust the ink clearance, an end section of a film blade, which defines the amount of ink, is machined. For example, a plurality of slits, which have proper separations and length, are formed in the end section of the film blade, or each part of the film blade, which corresponds to each segment, is partially cut. In the case of employing divided blades, the amount of ink is defined by ink clearance adjusting units, which respectively correspond to the segments.

In the Japanese Patent Gazettes No. 11-115159, an ink blade adjusting unit, which is capable of easily precisely adjusting a zero point of an ink blade, is disclosed. The ink blade adjusting unit includes: an ink tank; an ink supply roller; a plurality of divided ink blades, which are arranged in an axial direction of the ink supply roller; a detection unit, which detects if front ends of the blades contact an outer circumferential face of the ink supply roller or not; and a control unit for controlling motors, etc. on the basis of signals from the detection unit. When detection signal is sent from the detection unit to the control unit, the control unit controls the motor, etc. so as to adjust the amount of ink by adjusting the ink clearance, which is a space between the front ends of the ink blades and the outer circumferential face of the ink supply roller.

However, in the ink preset device disclosed in the Japanese Patent Gazette No. 8-11292, the slits must be formed in the film blade or the film blade must be partially cut on the basis of the data of the corrected ink clearance. The rate of area of picture is stored in the server, so the same film blade can be manufactured without re-scanning a printing plate. But the film blade must be machined every time so as to define the proper ink clearance. Therefore, it takes a long time to manufacture the film blade, and manufacturing cost of the film blade must be high. Especially, in the case of a color printing machine, four film blades for colors of magenta, cyanogen, yellow and black must be required, so manufacturing time must be longer.

In the case of the divided blades, the zero points of the divided blades may be adjusted by the ink blade adjusting units, but a standard width of the ink clearance must be manually adjusted on the basis of perception of a skilled operator. Therefore, it is difficult for unskilled operators to properly adjust the ink clearance. Especially, in the case of a color printing machine, the ink clearance for each color must be adjusted, so it takes a long time to adjust the ink clearance of the blades.

Further, the ink blade adjusting unit, which is disclosed in the Japanese Patent Gazette No. 11-115159, detects if front ends of the divided ink blades contact the ink supply roller or not so as to adjust the zero point. And, the ink blade adjusting unit drives the motor, etc. so as to move the ink blades, so that the ink clearance between the front ends of the ink blades and the ink supply roller can be adjusted. However, it is difficult to mechanically adjust the ink clearance. Namely, many factors, e.g., kinds of inks, temperature, humidity, influence to the amount of ink supplied through the ink clearance. Thus, the ink clearance must be adjusted on the basis of perception of a skilled operator. It is difficult for unskilled operators to properly adjust the ink clearance. Especially, in the case of a color printing machine, many points to be adjusted exist, so working efficiency must be lower. Further, if the ink blade adjusting unit is provided in the vicinity of the ink tank, the printing machine must be bigger and manufacturing cost of the printing machine must be increased.

SUMMARY OF THE INVENTION

An object of the present invention is to provide an image printing system, which is capable of solving the above described disadvantages of the conventional systems and properly defining the amount of ink without adjusting the ink clearance.

To achieve the object, the present invention has following structures.

The image printing system of the present invention comprises:

means for inputting image data of an original image on a printing plate;

an offset printing machine, in which proper amount of ink is supplied from an ink tank to a plate drum via an ink fountain roller on the basis of the image data so as to form an ink image on the plate drum, the ink image is transferred from the plate drum to a blanket drum, then the ink image is transferred onto a sheet-shaped medium, which is conveyed to a space between the blanket drum and a press drum;

memory means for storing the image data inputted by the inputting means, the memory means storing an ink amount table, in which rotational speed data of the ink fountain roller corresponds to rate of area of picture in the original image;

control means for calculating the rate of area of picture on the basis of the image data, reading the rotational speed of the ink fountain roller from the ink amount table on the basis of the rate of area of the picture, correcting the rotational speed so as to define proper control data for rotating the ink fountain roller, and sending the proper control data to the offset printing machine so as to control the amount of ink to be supplied to the plate drum.

In the image printing system, the memory means may further store a correcting value table, which includes values for correcting the rotational speed of the ink fountain roller on the basis of parameters, such as a kind of the ink, settings for printing; and the control means may further read the correcting value from the correcting value table and defines the proper rotational speed of the ink fountain roller.

In the image printing system, the offset printing machine may be provided to a bottom part of the ink tank and have a scraper, whose front end is located close to an outer circumferential face of the ink fountain roller, and the control means may control the rotational speed of the ink fountain roller without changing a position of the scraper.

The image printing system may further comprise means for adjusting a clearance between the scraper and the ink fountain roller.

In the image printing system of the present invention, the amount of ink is not controlled by adjusting the ink clearance, which is mainly controlled by perception of an operator in the conventional systems. The amount of ink is controlled by adjusting the rotational speed of the ink fountain roller, so that the system can be easily operated. And, the proper amount of ink can be quickly defined, so that printing efficiency can be improved.

Unlike the conventional systems, machining a film blade and adjusting the ink clearance of each segment are not required. Therefore, the image printing system of the present invention can be easily operated. Further, no ink blade adjusting unit is required, so manufacturing cost of the system can be reduced and the offset printing machine of the system can be smaller.

If means for adjusting the clearance between the scraper and the ink fountain roller is provided, the clearance can be precisely adjusted on the basis of light and shade of the image data without perception of an operator.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

First Embodiment

Figure 1:
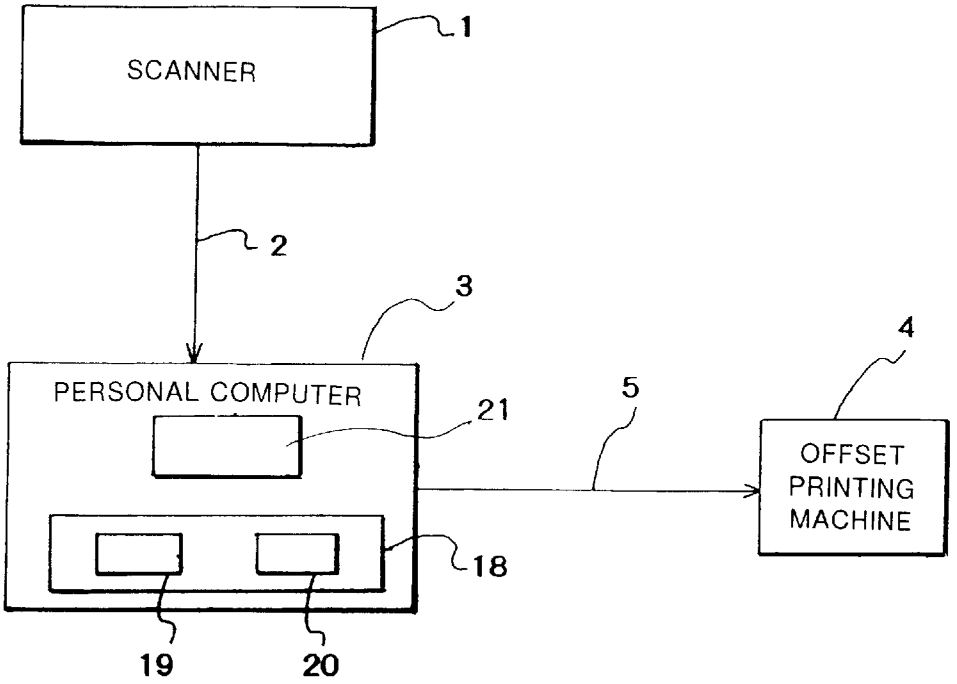
FIG. 1 is a block diagram of a first embodiment of the image printing system of the present invention.
Figure 2:
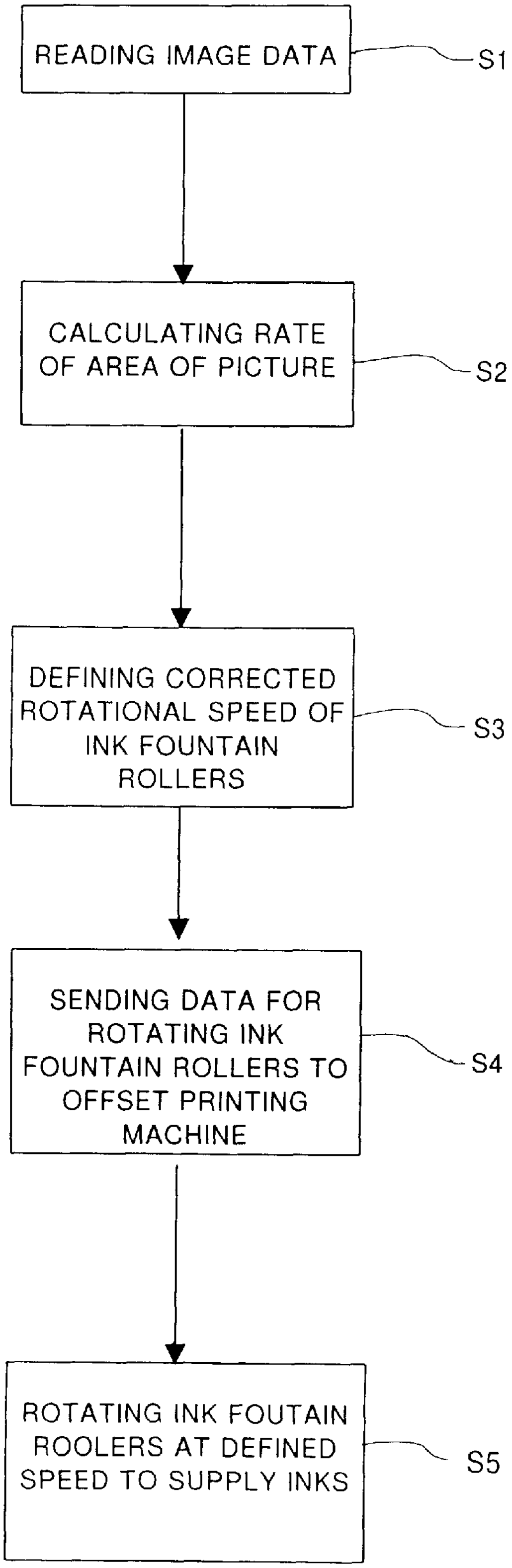
FIG. 2 is a flowchart showing action of the image printing system.

A first embodiment of the present invention will be explained with reference to FIGS. 1–3.

The image printing system of the present embodiment includes an offset printing machine, which is capable of printing monochrome and color images.

Firstly, an outline of the system will be explained with reference to a block diagram of FIG. 1. An image scanner 1 is an example of means for inputting image data. The image scanner 1 reads the image data from an original image film (a positive film or a negative film). In the case of the color printing system, the image data of four films, which respectively correspond to the colors of magenta, cyanogen, yellow and black, are read by the scanner 1. Note that, if the original image is drawn by a personal computer 3, the scanner 1 can be omitted. The image data, which have been read by the scanner 1, are sent to the personal computer 3, which is an example of control means, via communication lines 2. Note that, in other cases, the personal computer 3, a digital camera, a digital video camera, etc. may be employed as the input means.

An offset printing machine 4 prints an image by the steps of: forming an ink image, on a plate drum, on the basis of the image data read by the scanner 1; transferring the ink image from the plate drum to a blanket drum; and transferring the ink image from the blanket drum to a sheet-shaped medium, e.g., a paper card, a plastic card, which has been conveyed to a space (a nipping section) between the blanket drum and a press drum.

The offset printing machine 4 is capable of printing not only monochrome images but also color images. Therefore, the offset printing machine 4 has four printing sections, in each of which the image is printed with each color ink: magenta, cyanogen, yellow and black. The plate drum, the blanket drum, the press drum, etc. are provided in each printing section. The image for each color is printed in each printing section on the basis of the image data for each color, which are read by the scanner 1.

A memory section 18 of the personal computer 3 has hard disks, RAM, ROM, etc. The memory section 18 stores the image data. Further, the memory section 18 includes: an ink amount table 19, in which data of rotational speed data of ink fountain rollers corresponding to rate of area of picture in the original image are included; and a correcting value table 20, which includes values for correcting the rotational speed of the ink fountain rollers on the basis of parameters, e.g., kinds of inks, settings for printing. Namely, in the ink amount table 19, values of the proper rotational speed of the ink fountain roller, which correspond to the rate of picture in the image, have been written, as a data base, so as to supply proper amount of the inks; in the correcting value table 20, values for correcting the rotational speed data of the ink fountain rollers on the basis of the inputted parameters, e.g., environmental data of the offset printing machine 4 (temperature, humidity, etc.), setting data (kinds of inks, density of inks, etc.), have been written as a data base.

A control section 21 of the personal computer 3 controls the amount of inks by the steps of: calculating the rate of area of picture from the image data; reading the rotational speed of the ink fountain rollers, from the ink amount table 19, on the basis of the rate of area of picture; correcting the rotational speed of the ink fountain rollers on the basis of the correcting values stored in the correcting value table 20; and the data of the corrected rotational speed of the ink fountain rollers to the offset printing machine 4 so as to properly control the amount of the inks.

The action of the personal computer 3 will be explained. The personal computer 3 stores the image data, which have been read by the scanner 1, in the memory section 18. The control section 21 calculates the rate of area of picture in the whole image from the image data. Namely, the image data, which have been read by the scanner 1, are converted into data indicating light and shade of the image, then the rate of area of picture is calculated. In the case of a color image, the rate for the colors (magenta, cyanogen, yellow and black) are calculated.

The personal computer 3 reads out the rotational speed of the ink fountain rollers corresponding to the calculated rate of area of picture. from the ink amount table 19. When an operator inputs the parameter, the personal computer 3 reads out the correcting data for correcting the rotational speed of the ink fountain rollers from the correcting value table 20. Then, the personal computer 3 calculates to define the proper rotational speed of the ink fountain rollers. In the case of the color printing system, the above action is respectively executed for each printing section. The data of the proper rotational speed of the ink fountain rollers for each color section are sent to the offset printing machine 4 via communication lines 5, so that desired amount of each color ink can be supplied to print the image.

Next, the structure of the offset printing machine will be explained with reference to FIG. 3.

Figure 3:
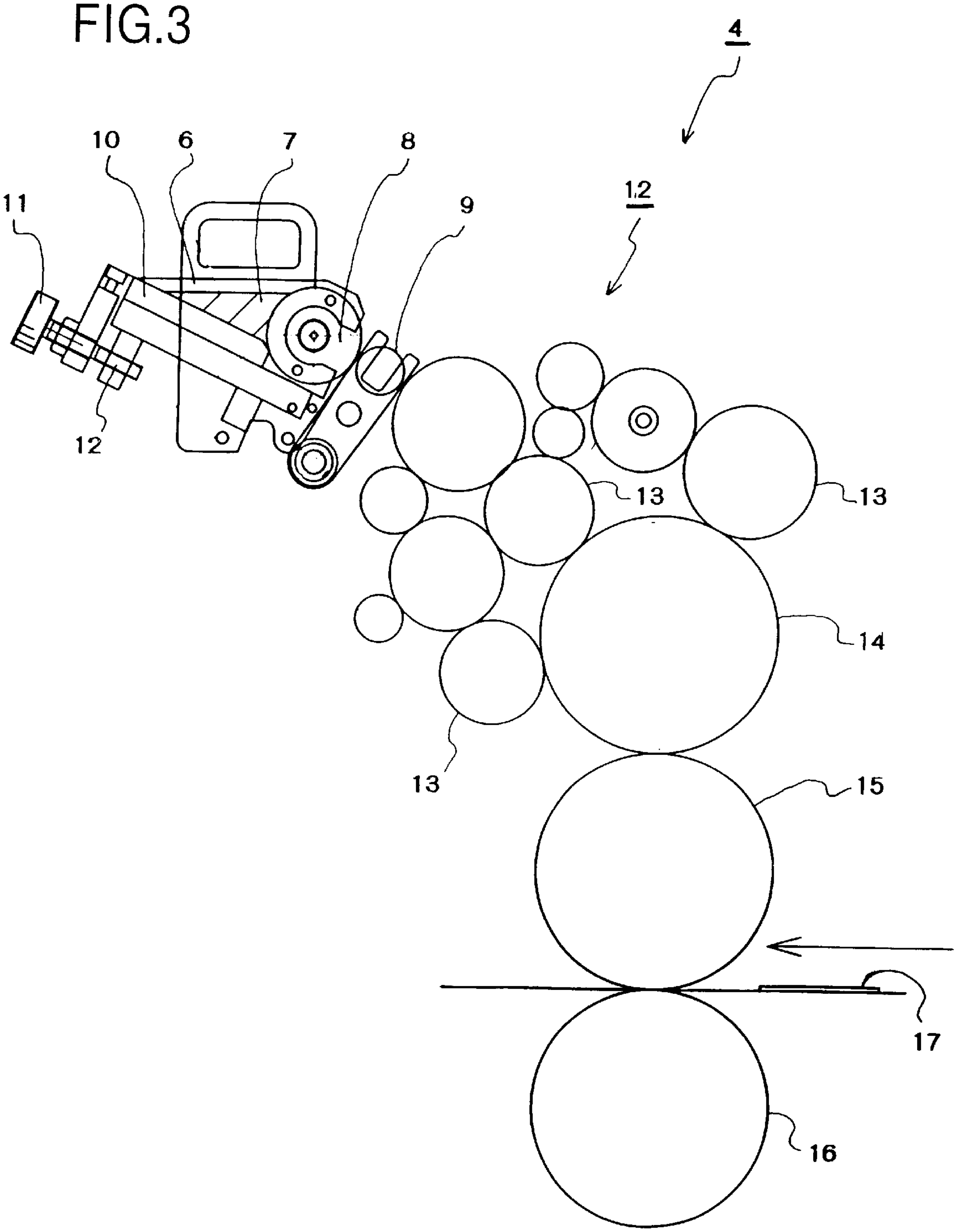
FIG. 3 is an explanation view of a main part of an offset printing machine.

One of the printing section is shown in FIG. 3. One of the color inks (magenta, cyanogen, yellow or black) is reservoired in an ink tank 6. An ink fountain roller 8 is rotated by a driving unit (not shown) so as to supply the ink 7, which has been reservoired in the ink tank 6, to an ink ductor roller 9. An scraper 10 is slidably provided to a bottom part of the ink tank 6. The scraper 10 is connected to a screw 12, which is connected to a knob 11. With this structure, the scraper 10 is moved close to and away from the ink fountain roller 8 by rotating the knob 11. The scraper 10 is made of, for example, rubber. A front end of the scraper 10 is set at a position close to the ink fountain roller 8. The position of the front end of the scraper 10 can be adjusted by rotating the knob 11. For example, in the present embodiment, the front end is moved 0.25 mm for one rotation of the knob 11. Once the front end is set at a proper position, the position is fixed. In the present embodiment, amount of the ink 7 to be supplied is adjusted by the rotational speed of the ink fountain roller 8, so, unlike the conventional systems, the clearance between the scraper 10 and the ink fountain roller 8 need not be adjusted precisely.

The ink 7, which has been supplied to the ink ductor roller 9, is kneaded and extended by ink kneading rollers 12 so as not to print stripe patterns, which are appeared if the ink 7 is not uniformly kneaded. The kneaded ink 7 is supplied to a plate drum 14 by three ink feed rollers 13. A printing plate, on which the image of the original image film has been printed, is wound round an outer circumferential face of a cylindrical body of the plate drum 14. The ink feed rollers 13 are moved close to and away from the plate drum 14. When the printing action is started, the ink feed rollers 13 are moved close to the plate drum 14 so as to supply the ink 7 to the printing plate, so that an ink image can be appeared thereon. If the ink feed rollers 13 always contact the plate drum 14, the printing plate is abraded and deformed.

A rubber blanket is wound round a cylindrical body of a blanket drum 15. The ink image on the printing plate of the plate drum 14 is transferred onto the rubber blanket. The nipping section is formed between the blanket drum 14 and a press drum 16. The ink image on the blanket drum 15 is further transferred onto a surface of a sheet-shaped medium 17, e.g., a name card, an envelope, a plastic IC card, which has been conveyed to the nipping section.

The position of the blanket drum 15 is fixed; the plate drum 14 and the press drum 16 are moved close to and away from the blanket drum 15 at prescribed timing. In the present embodiment, firstly the plate drum 14 is moved and pressed onto the blanket drum 15 when the printing action is started, then the press drum 16 is moved and pressed onto the blanket drum 15. While the offset printing machine 4 is operated, the press drum 16 is continuously pressed on the blanket drum 15. On the other hand, the plate drum 14 is moved away from the blanket drum 15 when each cycle of the printing action is completed. When the offset printing machine 4 is stopped, the press drum 16 is moved away from the blanket drum 15.

Note that, without reference to the states of the drums 14, 15 and 16, they are synchronously rotated by one driving mechanism (not shown) including engaged gears. When the plate drum 14 and the press drum 16 are pressed onto the blanket drum 15, engaging depth of the gears are merely made deeper.

The sheet-shaped medium 17 is conveyed to the nipping section between the blanket drum 15 and the press drum 16, at prescribed timing, so as to transfer (print) the ink image thereon. In the case of the color printing system, the ink images of the four colors are printed, in order, on the sheet-shaped medium 17.

Successively, the action of the image printing system will be explained with reference to a flowchart of FIG. 2.

Firstly, the operator sets the original image film in the scanner 1 so as to scan the whole image. In the case of the color image, four image films, each of which corresponds to each color, are scanned to read the image data for each color (STEP S1).

The image data are sent to the personal computer 3. The control section 21 of the computer 3 calculates the rate of area of picture in the image. The calculating action is executed for each color, so the action is executed four times for one original image (STEP S2).

Next, the operator inputs the parameters, e.g., temperature, humidity, kinds of the inks, density of the inks, to the personal computer 3. The rotational speed of the ink fountain rollers 8, which correspond to the rate of area of picture, are read out from the ink amount table 19. Further, the correcting values, which correspond to the parameters, are read out from the correcting value table 20. Then, the corrected rotational speed of the ink fountain rollers 8 are calculated (STEP S3).

The data of the corrected rotational speed of the ink fountain rollers 8 are sent to the offset printing machine 4 (STEP S4).

The ink fountain rollers 8 of the offset printing machine 4 are rotated on the basis of the data of the corrected rotational speed. When the printing action is started in one printing section, the ink fountain roller 8 is rotated at the corrected rotational speed so as to supply a proper amount of the ink 7 from the ink tank 6 to the plate drum 14 (STEP S5). By supplying the ink 7 to the plate drum 14, the ink image is formed on the printing plate of the plate drum 14. The plate drum 14 is pressed onto the blanket drum 15 at prescribed timing so as to transfer the ink image from the plate drum 14 to the blanket drum 15. Further, the ink image on the blanket drum 15 is transferred or printed on the sheet-shaped medium 17, which has been held at the nipping section between the blanket drum 15 and the press drum 16.

This action is repeated in other printing sections for printing the full color image on the sheet-shaped medium 17.

In the present embodiment, unlike the conventional system, the amount of supplying the ink 7 is not controlled by adjusting the ink clearance of the scraper 10, which is difficult for unskilled operators. The amount of the ink 7 can be easily controlled by adjusting the rotational speed of the ink fountain rollers 8. And, shade of printing can be easily set. Therefore, the image printing system of the present embodiment is easily operated, so printing efficiency can be improved.

In the present embodiment, no film blades are provided and adjusting the ink clearance is not required, so that the offset printing machine 4 can be smaller and its manufacturing cost can be reduced.

Second Embodiment

A second embodiment of the present invention will be explained with reference to FIGS. 4 and 5. Note that, elements explained in the first embodiment are assigned the same symbols and explanation will be omitted.

Once the clearance of the scraper is adjusted, it is usually fixed. But, in the case of printing extremely light or deep images, the clearance of the scraper must be adjusted. To adjust the clearance of the scraper, the image printing system of the second embodiment has adjusting means.

Figure 4:
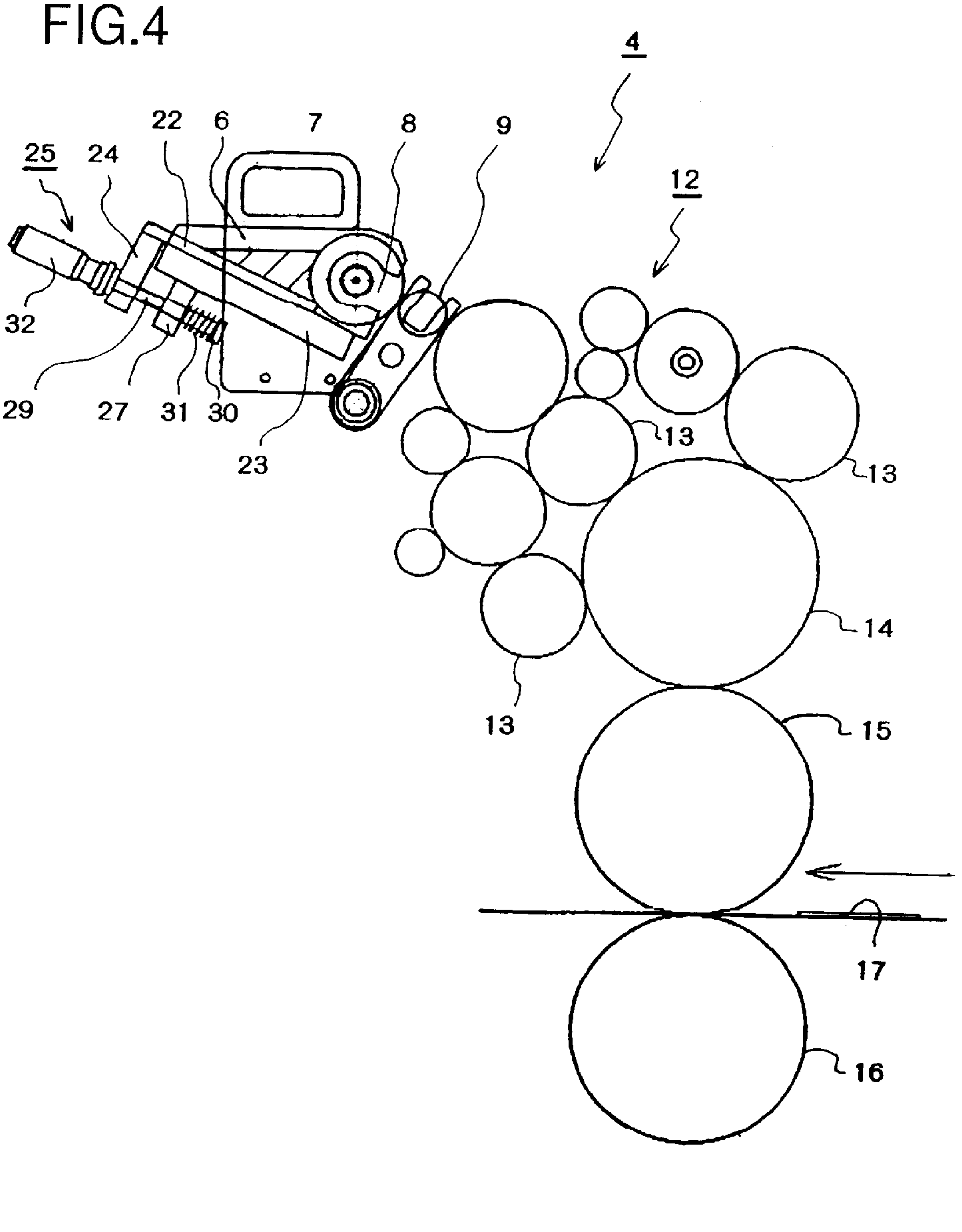
FIG. 4 is an explanation view of a main part of an offset printing machine of a second embodiment.
Figure 5:
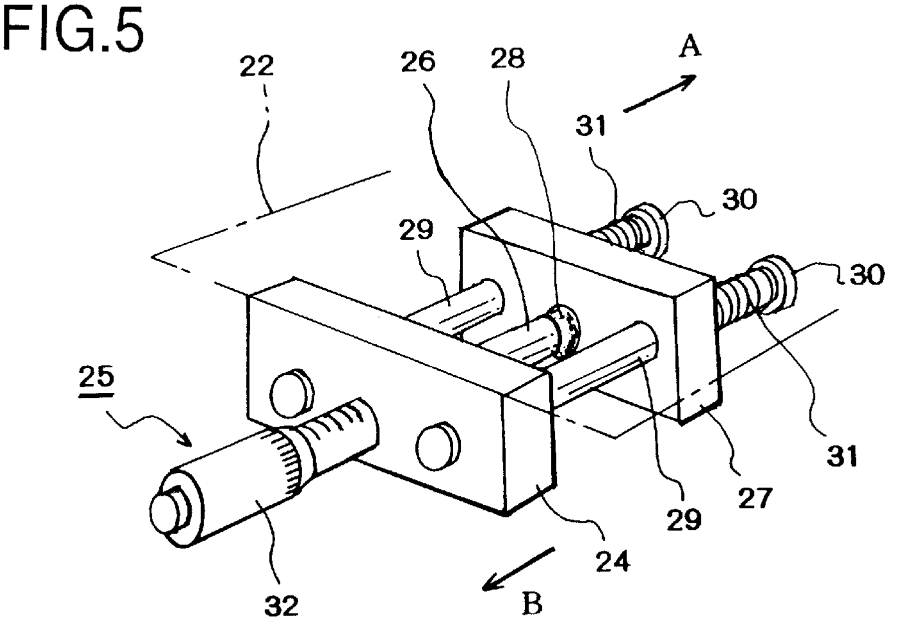
FIG. 5 is an explanation view of means for adjusting clearance between a scraper and an ink fountain roller shown in FIG. 4.

In FIGS. 4 and 5, a scraper 22 is provided to a bottom part of the ink tank 6. The scraper 22 is capable of sliding along an upper face of a base member 23. The scraper 22 is a metal plate, whose thickness is, for example, 5 mm. A block 24 is fixed to a rear end of the scraper 22. A micrometer head 25 is attached to the block 24. A spindle 26 of the micrometer head 25 is pierced through a block 24. A front end of the spindle 26 contacts a metal ball 28, which is provided to a guide block 27 of the base member 23.

Two guide rods 29 are pierced through the guide block 27. One end of guide each rod 29 is fixed to the block 24; the other end thereof is projected from the guide block 27 and a spring stopper 30 is fixed thereto. A coil springs 31 is elastically attached between the guide block 27 and each spring stopper 30. With this structure, the guide rods 29 are always biased in a direction of an arrow "A" (see FIG. 5). Thus, the block 24 is also biased in the direction "A", and the front end of the spindle 26 of the micrometer head 25 always contacts the metal ball 28. If a dial 32 of the micrometer head 25 is turned one division of scale, the spindle 26 is linearly moved 5/100 mm.

By turning the dial 32 of the micrometer head 25, the spindle 26 pushes the metal ball 28 in the direction "A", so that the block 24 is relatively moved in a direction of an arrow "B" (see FIG. 5). Namely, the scraper 22 is slightly moved backward with respect to the ink fountain roller 8, so that the clearance between the scraper 22 and the ink fountain roller 8 ca be precisely adjusted.

The clearance of the scraper 22 should be adjusted, by turning the dial 32 of the micrometer head 25, prior to the printing action. The clearance is not adjusted as far as printing conditions are changed. The amount of the ink can be adjusted by adjusting the rotational speed of the ink fountain roller 8 as well as the first embodiment.

Since the clearance of the scraper 22 and the ink fountain roller 8 can be precisely adjusted by the micrometer head 25, even if the original image is a extremely light or deep image, the clearance can be properly adjusted without depending on perception of the operator.

Third Embodiment

A third embodiment of the present invention will be explained with reference to FIGS. 6–8B. Note that, elements explained in the foregoing embodiments are assigned the same symbols and explanation will be omitted.

Another means for adjusting the clearance of the scraper will be explained in the third embodiment.

Figure 7:
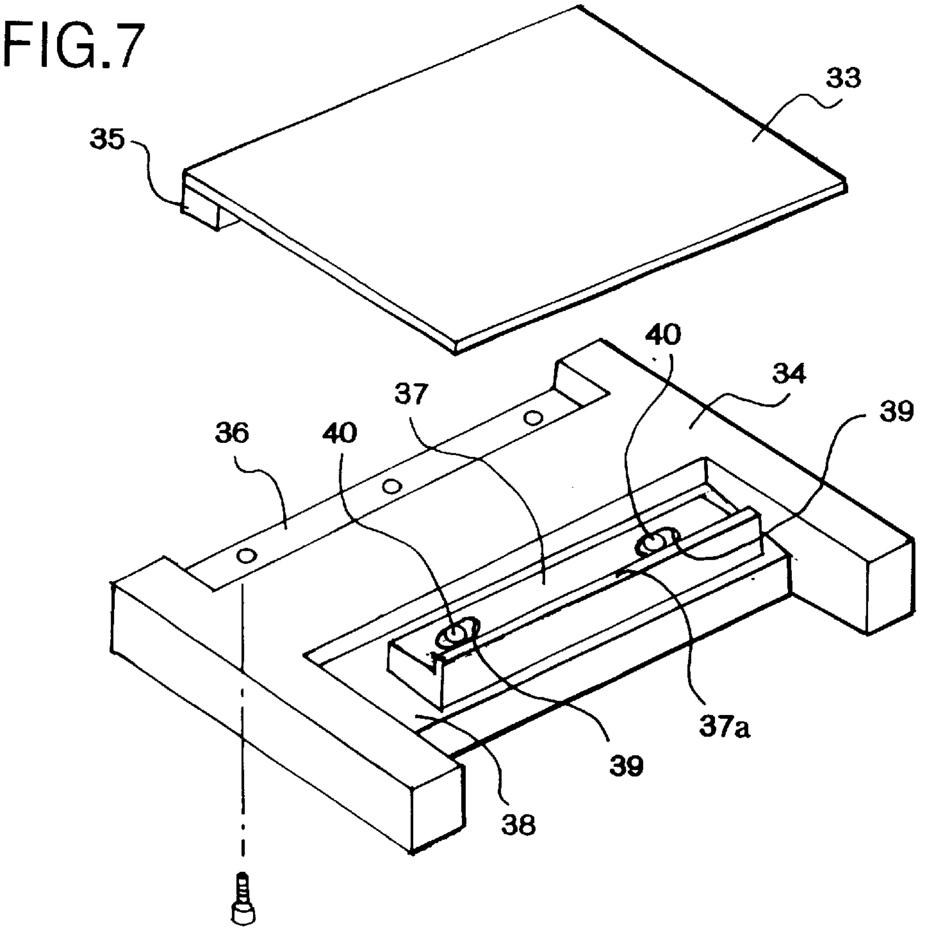
FIG. 7 is an explanation view of means for adjusting clearance between a scraper and an ink fountain roller shown in FIG. 6.
Figure 6:
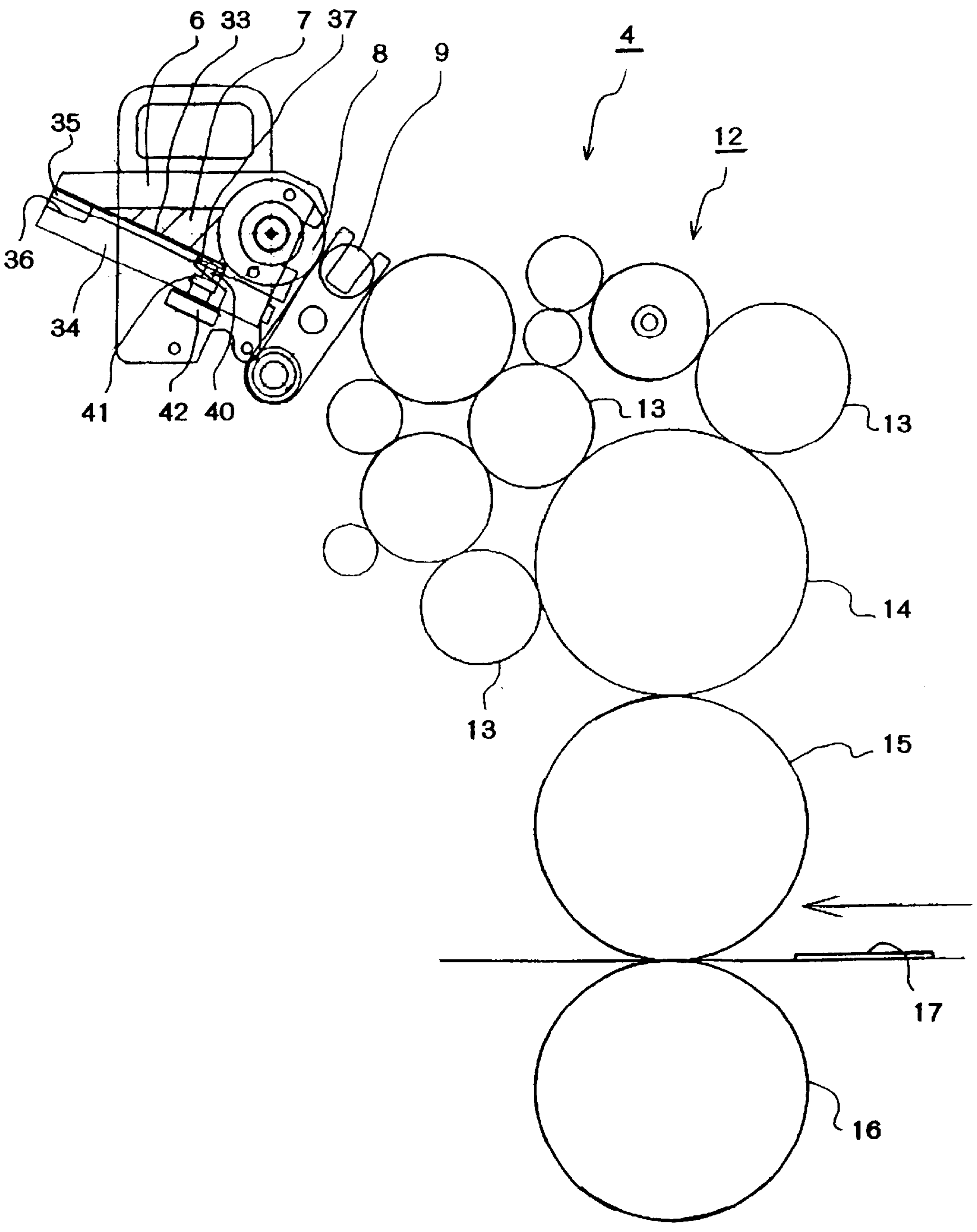
FIG. 6 is an explanation view of a main part of an offset printing machine of a third embodiment.

In FIG. 6, a scraper 33 is provided to a bottom part of the ink tank 6 and capable of sliding along an upper face of a base member 34. The scraper 33 is an elastic metal plate, whose thickness is, for example, 0.8 mm. In FIG. 7, a rear end of the scraper 33 is fixed, by spot welding, to a setting plate 35, which is made of, e.g., a stainless steel. The setting plate 35 is fixed in a concave section 36 of the base member 34 by screws. A free front end of the scraper 33 is supported by a supporting section 37*a* of a slide block 37. The slide block 37 is slidably provided in an inclined concave section 38 of the base member 34. A bottom face of the slide block 37 contacts an upper face of the inclined concave section 38, and both faces are inclined with respect to the horizontal plane. With this structure, vertical level of the supporting section 37*a* can be changed by sliding the slide block 37, so that the clearance between the scraper 33 and the ink fountain roller 8 can be precisely adjusted (see FIG. 8B).

Figure 8A:
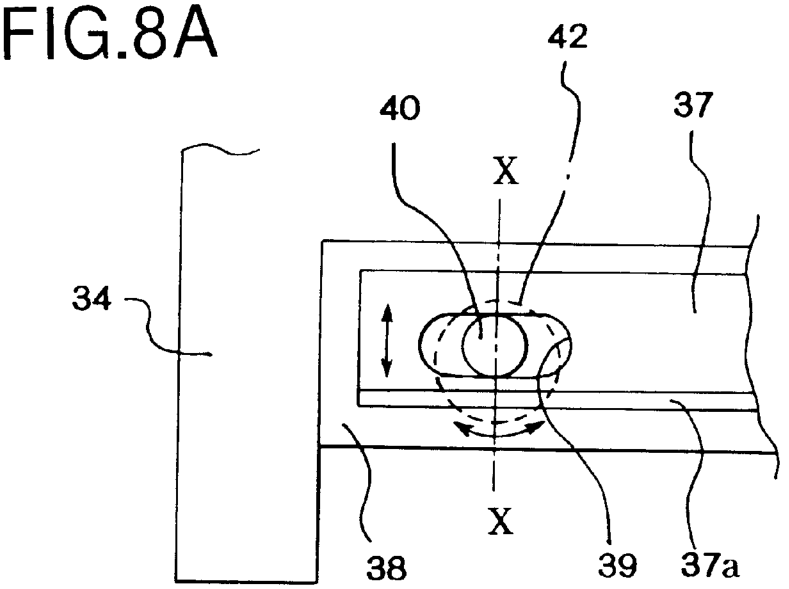
FIG. 8A is a plan view of the adjusting means shown in FIG. 7.
Figure 8B:
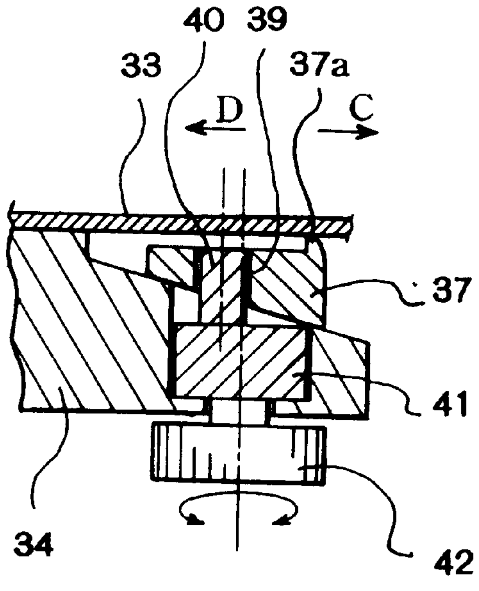
FIG. 8B is a sectional view taken along a line X—X shown in FIG. 7.

In FIG. 8A, the slide block 37 has long holes 39, and eccentric shafts 40 are respectively fitted in the long holes 39. As shown in FIG. 8B, each eccentric shaft 40 is fixed to each columnar member 41, which is provided in the base member 34, and shifted from an axial line of the columnar member 41. The columnar members 41 are respectively connected to dials 42, which are provided on a bottom face of the base member 34. Outer circumferential faces of the dials 42 are knurled. The columnar members 41 are rotated together with the dials 42. Scale divisions are grooved in the dials 42.

By rotating the dials 42 in a prescribed direction, the columnar members 41 are rotated, so that the eccentric shafts 40 push inner faces of the long holes 39 of the slide block 37 in a direction of an arrow "C" (see FIG. 8B). At that time, the slide block 37 is slightly moved in the direction "C", so that the scraper 33 is slightly moved away from the ink fountain roller 8 and the clearance of the scraper 33 is made wider. On the other hand, by rotating the dials 42 in the opposite direction, the eccentric shafts 40 push the inner faces of the long holes 39 of the slide block 37 in a direction of an arrow "D" (see FIG. 8B). At that time, the slide block 37 is slightly moved in the direction "D", so that the scraper 33 is slightly moved close to the ink fountain roller 8 and the clearance of the scraper 33 is made narrower.

The clearance between the scraper 33 and the ink fountain roller 8 can be precisely adjusted by the eccentric shafts 40, which are moved by rotating the dials 42.

Since the clearance of the scraper 33 and the ink fountain roller 8 can be precisely adjusted by rotating the dials 42, even if the original image is a extremely light or deep image, the clearance can be properly adjusted without depending on perception of the operator.

Fourth Embodiment

Figure 9:
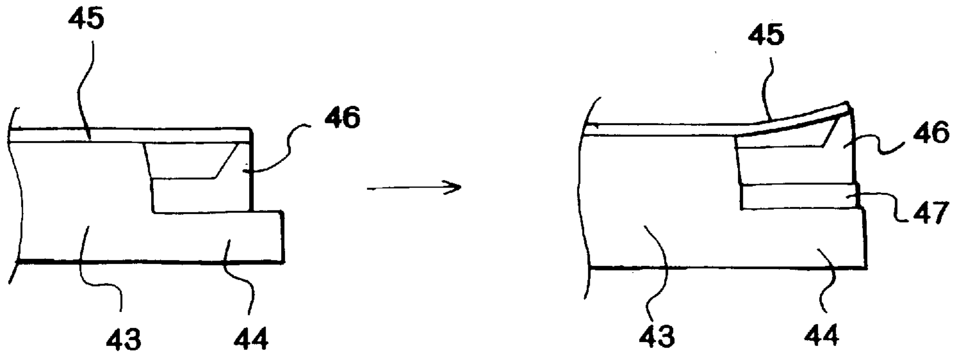
FIG. 9 is an explanation view of the adjusting means of a fourth embodiment.

A fourth embodiment of the present invention will be explained with reference to FIG. 9. Note that, elements explained in the foregoing embodiments are assigned the same symbols and explanation will be omitted.

Further another means for adjusting the clearance of the scraper will be explained in the third embodiment.

A holding section 44 is formed at one end of a base member 43, which is on the ink fountain roller (not shown) side. A supporting block 46, which is capable of supporting the front end of a scraper 45, is provided to the holding section 44. A spacer 47 (or spacers) is inserted between the holding section 44 and the supporting block 46 so as to adjust the clearance between the scraper 45 and the ink fountain roller. The clearance can be easily changed by changing a thickness of the spacer 47 or a total thickness of the spacers.

The present invention is not limited to the above described embodiments. For example, the input means is not limited to the scanner 1, so the personal computer 3, a digital camera, etc. may be employed as the input means. The parameters inputted to the personal computer 3 are not limited to temperature, humidity and kinds of inks. Other elements, for example, the clearance between the scraper and the ink fountain roller may be inputted as the parameter for correcting the rotational speed of the ink fountain roller. Further, outer memory means, e.g., a server, may be employed as the memory means.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An image printing system, comprising:

means for inputting image data of an original image on a printing plate;

an offset printing machine, in which proper amount of ink is supplied from an ink tank to a plate drum via an ink fountain roller on the basis of said image data so as to form an ink image on said plate drum, said ink image is transferred from said plate drum to a blanket drum, then said ink image is transferred onto a sheet-shaped medium, which is conveyed to a space between said blanket drum and a press drum;

memory means for storing said image data inputted by said inputting means, said memory means storing an ink amount table, in which rotational speed data of said ink fountain roller correspond to rate of area of picture in said original image;

control means for calculating the rate of area of picture on the basis of said image data, reading the rotational speed of said ink fountain roller from said ink amount table on the basis of the rate of area of the picture, correcting the rotational speed so as to define proper control data for rotating said ink fountain roller, and sending said proper control data to said offset printing machine so as to control the amount of ink to be supplied to said plate drum.

2. The image printing system according to claim 1, wherein said memory means further stores a correcting value table, which includes values for correcting the rotational speed of said ink fountain roller on the basis of parameters, such as a kind of the ink, settings for printing; and said control means further reads the correcting value from said correcting value table and defines the proper rotational speed of said ink fountain roller.

3. The image printing system according to claim 1, wherein said offset printing machine is provided to a bottom part of said ink tank and has a scraper, whose front end is located close to an outer circumferential face of said ink fountain roller, and said control means controls the rotational speed of said ink fountain roller without changing a position of said scraper.

4. The image printing system according to claim 3, further comprising means for adjusting a clearance between said scraper and said ink fountain roller.

* * * * *